United States Patent
Van Hook

(10) Patent No.: US 7,039,241 B1
(45) Date of Patent: May 2, 2006

(54) METHOD AND APPARATUS FOR COMPRESSION AND DECOMPRESSION OF COLOR DATA

(75) Inventor: Timothy J. Van Hook, Atherton, CA (US)

(73) Assignee: ATI Technologies, Inc., Thornhill (CA)

( * ) Notice: Subject to any disclaimer, the term of this patent is extended or adjusted under 35 U.S.C. 154(b) by 506 days.

(21) Appl. No.: 09/637,456

(22) Filed: Aug. 11, 2000

(51) Int. Cl.
*G06K 9/46* (2006.01)

(52) U.S. Cl. ..................................... 382/232
(58) Field of Classification Search .............. 382/168, 382/232–251; 375/240–243; 348/384.1–440.1
See application file for complete search history.

(56) References Cited

U.S. PATENT DOCUMENTS

| | | | | |
|---|---|---|---|---|
| 4,568,983 A | * | 2/1986 | Bobick | 358/409 |
| 5,263,136 A | * | 11/1993 | DeAguiar et al. | 345/538 |
| 5,471,248 A | * | 11/1995 | Bhargava et al. | 375/240.24 |
| 5,486,826 A | * | 1/1996 | Remillard | 341/51 |
| 5,805,226 A | * | 9/1998 | Jung | 375/240.24 |
| 6,005,624 A | * | 12/1999 | Vainsencher | 375/240.14 |
| 6,018,366 A | * | 1/2000 | Asai et al. | 375/240.18 |
| 6,081,209 A | * | 6/2000 | Schuyler et al. | 341/51 |
| 6,360,019 B1 | * | 3/2002 | Chaddha | 382/253 |
| 6,400,763 B1 | * | 6/2002 | Wee | 375/240.16 |
| 6,668,086 B1 | * | 12/2003 | Enokida | 382/233 |

* cited by examiner

*Primary Examiner*—Samir Ahmed
*Assistant Examiner*—Brian Le
(74) *Attorney, Agent, or Firm*—Brown Raysman Millstein Felder & Steiner LLP

(57) ABSTRACT

The present invention provides a scheme for compressing the color components of image data. The pixel data is grouped into a plurality of tiles for storage. A test is performed to determine if a tile can be compressed so that its size after compression is less than its size before compression. If so, the tile is compressed. A tile table is provided that includes a flag that can be set for each tile that is compressed. In a data transfer from memory to a graphics processor, the tile table is examined to identify those tiles that are compressed and must be decompressed prior to use. In one embodiment, a number of compression schemes are available for use on a tile and the best compression scheme is chosen on a tile by tile basis. The invention includes an identifying code for each compression scheme (stored as a value in each compressed tile).

4 Claims, 4 Drawing Sheets

METHOD AND APPARATUS FOR COMPRESSION AND DECOMPRESSION OF COLOR DATA

BACKGROUND

1. Field of the Invention

This invention relates to the field of image data compression.

Portions of the disclosure of this patent document contain material that is subject to copyright protection. The copyright owner has no objection to the facsimile reproduction by anyone of the patent document or the patent disclosure as it appears in the Patent and Trademark Office file or records, but otherwise reserves all copyright rights whatsoever.

2. Background

Three dimensional graphics processing applications require the storage and processing of large amounts of data. In particular, color information takes up a large amount of memory. In addition, the time it takes to transfer color data from memory to a graphics processor can negatively affect the ability to process graphics data. There is a need to reduce the amount of memory needed to store graphics data and to improve the ability to quickly transfer graphics data from memory to processor. This problem can be understood by reviewing the way that graphics systems process data.

Computer systems are often used to display generate and display graphics on a display. Display images are made up of thousands of tiny dots, where each dot is one of thousands or millions of colors. These dots are known as picture elements, or "pixels". Each pixel has a color, with the color of each pixel being represented by a number value stored in the computer system.

A three dimensional display image, although displayed using a two dimensional array of pixels, may in fact be created by rendering of a plurality of graphical objects. Examples of graphical objects include points, lines, polygons, and three dimensional solid objects. Points, lines, and polygons represent rendering "primitives" which are the basis for most rendering instructions. More complex structures, such as three dimensional objects, are formed from a combination or mesh of such primitives. To display a particular scene, the visible primitives associated with the scene are drawn individually by determining those pixels that fall within the edges of the primitive, and obtaining the attributes of the primitive that correspond to each of those pixels. The obtained attributes are used to determine the displayed color values of applicable pixels.

Sometimes, a three dimensional display image is formed from overlapping primitives or surfaces. A blending function based on an opacity value associated with each pixel of each primitive is used to blend the colors of overlapping surfaces or layers when the top surface is not completely opaque. The final displayed color of an individual pixel may thus be a blend of colors from multiple surfaces or layers.

In some cases, graphical data is rendered by executing instructions from an application that is drawing data to a display. During image rendering, three dimensional data is processed into a two dimensional image suitable for display. The three dimensional image data represents attributes such as color, opacity, texture, depth, and perspective information. The draw commands from a program drawing to the display may include, for example, X and Y coordinates for the vertices of the primitive, as well as some attribute parameters for the primitive (color and depth or "Z" data), and a drawing command. The execution of drawing commands to generate a display image is known as graphics processing.

Three dimensional data processing is very data intensive. The color data for a pixel is typically 24 or 32 bits. For a megapixel display, large amounts of storage are required just to store the data to be displayed.

SUMMARY OF THE INVENTION

The present invention provides a scheme for compressing the color components of image data. The pixel data is grouped into a plurality of tiles for storage. A test is performed to determine if a tile can be compressed so that its size after compression is less than its size before compression. If so, the tile is compressed. A tile table is provided that includes a flag that can be set for each tile that is compressed. In a data transfer from memory to a graphics processor, the tile table is examined to identify those tiles that are compressed and must be decompressed prior to use.

In one embodiment, a number of compression schemes are available for use on a tile and the best compression scheme is chosen on a tile by tile basis. The invention includes an identifying code for each compression scheme (stored as a value in each compressed tile).

DETAILED DESCRIPTION OF THE INVENTION

A method and apparatus for compression of color image data is described. In the following description, numerous specific details are set forth in order to provide a more detailed description of the invention. It will be apparent, however, to one skilled in the art, that the present invention may be practiced without these specific details. In other instances, well known details have not been provided so as to not unnecessarily obscure the invention.

The present invention provides for a compression scheme to reduce the amount of data that needs to be stored in memory. The compressed data can be transferred from memory to processor at a higher bandwidth than uncompressed data, improving performance. The invention also provides for a method of decompressing the color data at the processor. The compression scheme of the invention is a lossless scheme so that no image information is lost. The invention operates under two constraints, that the compressed image data is less than or equal to the image data uncompressed, and that the bandwidth of transferring the compressed image data is less than or equal to the bandwidth of the uncompressed image data.

Data Organization

The invention organizes color images in 2 dimensional groups of pixels referred to as tiles. In one embodiment, the tiles are 8 pixel by 8 pixel tiles. Where each pixel is 16 bits of color data per pixel, then a tile of pixels is 128 bytes (4 memory words in a memory system which accesses 32 byte words). Other configurations of tiles can be used without departing from the scope and spirit of the present invention.

Tile Compression

The present invention considers each tile to be written to memory as a candidate for compression. The invention determines whether the compression of the tile would save memory or not and processes the tile accordingly. As a result, each individual tile could be compressed or uncompressed. The compression status of each tile could be stored in the tile itself. However, an uncompressed tile has no available space to indicate it's status as an uncompressed tile. In addition, at least the first word of each tile would need to be read to determine if it is compressed or not, reducing memory efficiency, because reading the first word of a tile before making a decision about how many memory words to read would make typical pipelined memory access difficult. To avoid these problems, the present invention includes a means of tracking the compression status of each tile via a Tile Format Table (TFT). The TFT includes an entry for each tile in the table. When the tile is written to memory, its corresponding TFT entry is updated to indicate whether it is compressed or not.

Figure 1:
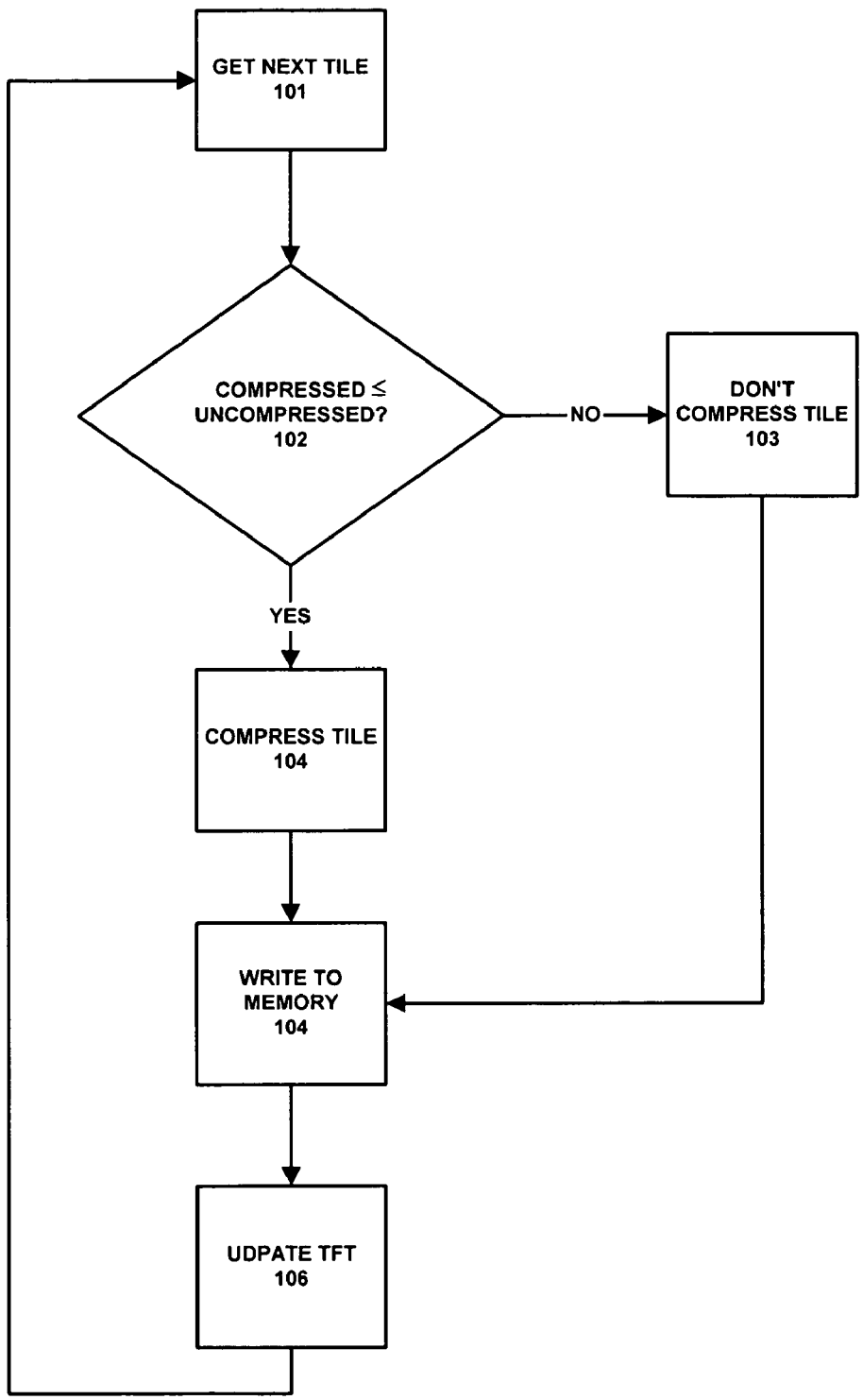
FIG. 1 is a flow diagram of the compression of tiles and updating of the TFT in the present invention.

A flow diagram of the compression of tiles and updating of the TFT in the present invention is illustrated in FIG. 1. At step 101 the graphics processor gets the next tile to be written to memory. At step 102 it is determined if after compression the compressed tile will be less than or equal to the uncompressed tile (i.e. the original tile). If not, the tile remains uncompressed at step 103. If the compressed tile would be less than or equal to the uncompressed tile the tile is compressed at step 104. After either step 103 or 104, the tile is written to memory at step 105. At step 106, the appropriate entry in the TFT is updated to indicate the compressed/uncompressed status of the tile. The system then returns to step 101.

Figure 2:
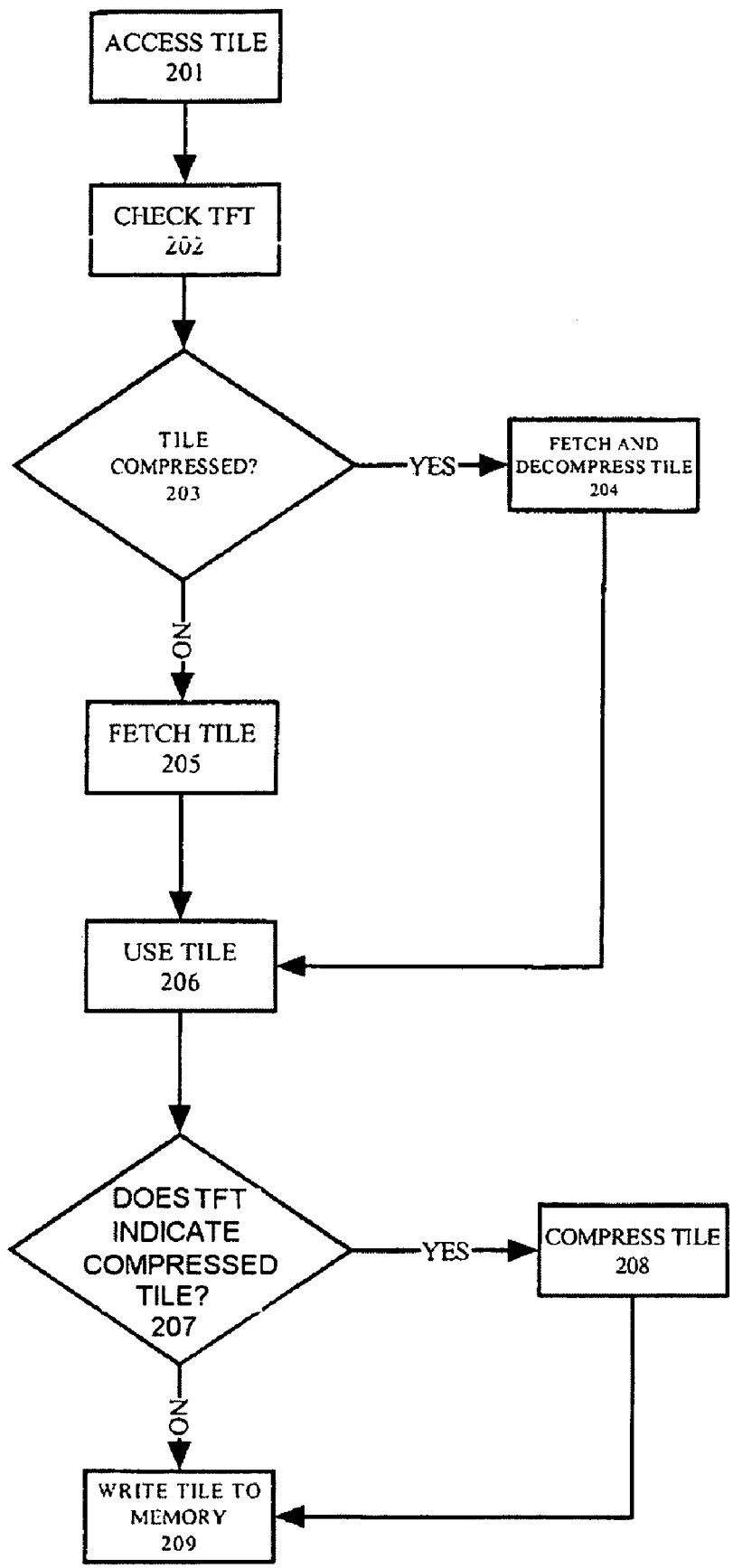
FIG. 2 is a flow diagram illustrating the reading of a tile from memory and the writing back of a tile to memory.

A tile is decompressed into color pixels when the tile is read from memory for graphics processing and is compressed when written back to memory. FIG. 2 is a flow diagram illustrating the reading of a tile from memory and the writing back of a tile to memory. At step 201 the tile is accessed from memory. At step 202 the TFT entry for that tile is examined. At step 203 it is determined if the TFT entry indicates a compressed tile. If so, the tile is fetched and decompressed at step 204. If not, the tile is simply fetched at step 205. After either step 204 or 205, the tile is used by the graphics processor at step 206. When writing a tile back to memory, the TFT is again checked at step 207 to see if the tile was a compressed tile. If so, the tile is compressed at step 208. After step 208, or if the tile was not a compressed tile, it is written back to memory at step 209.

TFT Structure

The present invention contemplates the ability to apply different compression schemes to each tile, and for each tile to be compressed to a different number of words. For example, if an uncompressed pixel tile contains 4 memory words, then a compressed tile could be one, two, or three words in length. Correspondingly, the TFT contains a value 1 to 4 for each tile describing the number of words containing the compressed tile (1 to 3 words) or the uncompressed pixel tile (4 words if the tile cannot be compressed into fewer than 4 words).

When a tile is read from memory for graphics processing, the TFT entry for the tile says how many words to read and whether to decompress the tile. When a tile is written to memory, the TFT entry for the tile is updated with the number of words into which the tile is compressed. In one embodiment, the TFT contains an addtional status indicator which can be used to indentify a tile as invalid. When a tile is invalid, a background color can be substitued for the tile. This embodiment supports a color image initialization capability (clearing all tiles to a background color) by setting all TFT tiles to invalid. This can be accomplished using this embodiment at much higher speed than writing the memory image, and avoids the first read of each tile when it is rendered. (Note that the TFT status for a tile becomes valid whenever the tile is written).

Figure 3:
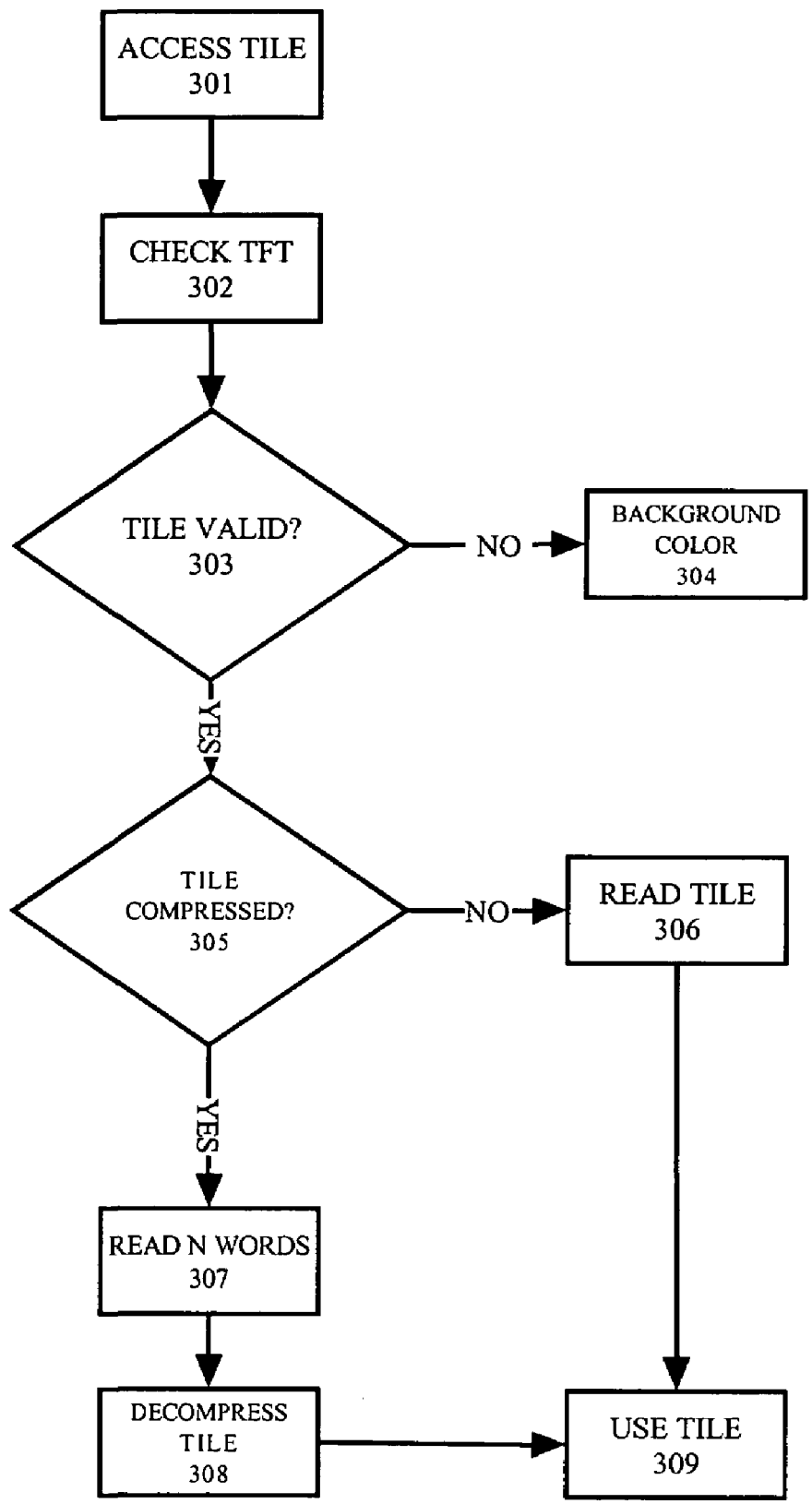
FIG. 3 is a flow diagram illustrating a read operation.

FIG. 3 is a flow diagram illustrating the read operation for the above embodiment. At step 301, a tile is accessed. At step 302, its corresponding TFT entry is examined. At step 303 it is determined if the tile is a valid tile. If not, a background color is substituted for the tile at step 304. If the tile is valid, it is determined at step 305 if it is a compressed tile. If not, the tile is read at step 306. If the tile is compressed, the proper number of words of the tile are read at step 307 and the tile is decompressed at step 308. After either step 306 or step 308, the tile is used by the processor at step 309.

Other system elements, such as a CPU or display controller, which access the compressed images generated by the graphics processor, need to perform decompression and optionally compression. This means that the TFT is a shared system resource. The TFT can act as a shared resource by being multibuffered much like color images are multibuffered, that is, one copy of the TFT accessed by the graphics processor during rendering one image, and another copy of the TFT accessed by display or other system elements for another image.

Because the number of tiles in a typical image can be large, such as 32K 8×8 tiles in a 2M pixel image, even with only a few compression states stored in the TFT, such as 4 states of valid, 1 or 2 word compressed, uncompressed, in 2 bits per entry, the TFT memory can be significant, (as much as 4K bytes). The TFT itself can be be cached in the graphics processor and maintained in memory to reduce on chip TFT storage. In this case a graphics memory access can update the TFT cache entry from the memory TFT if the tile entry it requires is not in the cache. Updating the TFT cache can be pipelined with graphics processor compression and decompression in conjunction with pipelined memory access. Typically the TFT cache entries are updated on memory read and therefore available for the later memory write of the same tiles. A memory TFT with graphics processor cache also simplifies providing access to the TFT by other system elements, insofar as the memory TFT is accessible by other system elements.

Tile Caching

In a typical implementation, the graphics processor anticipates image tiles that it will process, reads memory words in advance of processing (prefetch), and buffers memory tiles it has completed processing in advance of writing memory words. This pipelining of memory reads, graphics processing, and memory writes allows enough computing time to perform compression and decompression in parallel with processing. One implementation of pipelined memory access and graphics processing is an image cache, in which tiles are cache lines which are read from memory on cache line misses and written to memory on cache line evictions.

Write Only Mode

Some graphics processors in some rendering modes render pixels in images by only writing the pixels without reading those pixels from the image in memory (write only). When memory words contain multiple pixels, the pixels written to the word are write enabled in the memory, and the pixels not written to the word are write masked (memory device write mask bits, and memory chip enables and/or write enables are used to enable and disable writing portions of memory words). This pixel write only operation interracts with compression, because a compressed tile does not contain pixels at specific portions of memory words which can be selectively write enabled.

Figure 4:
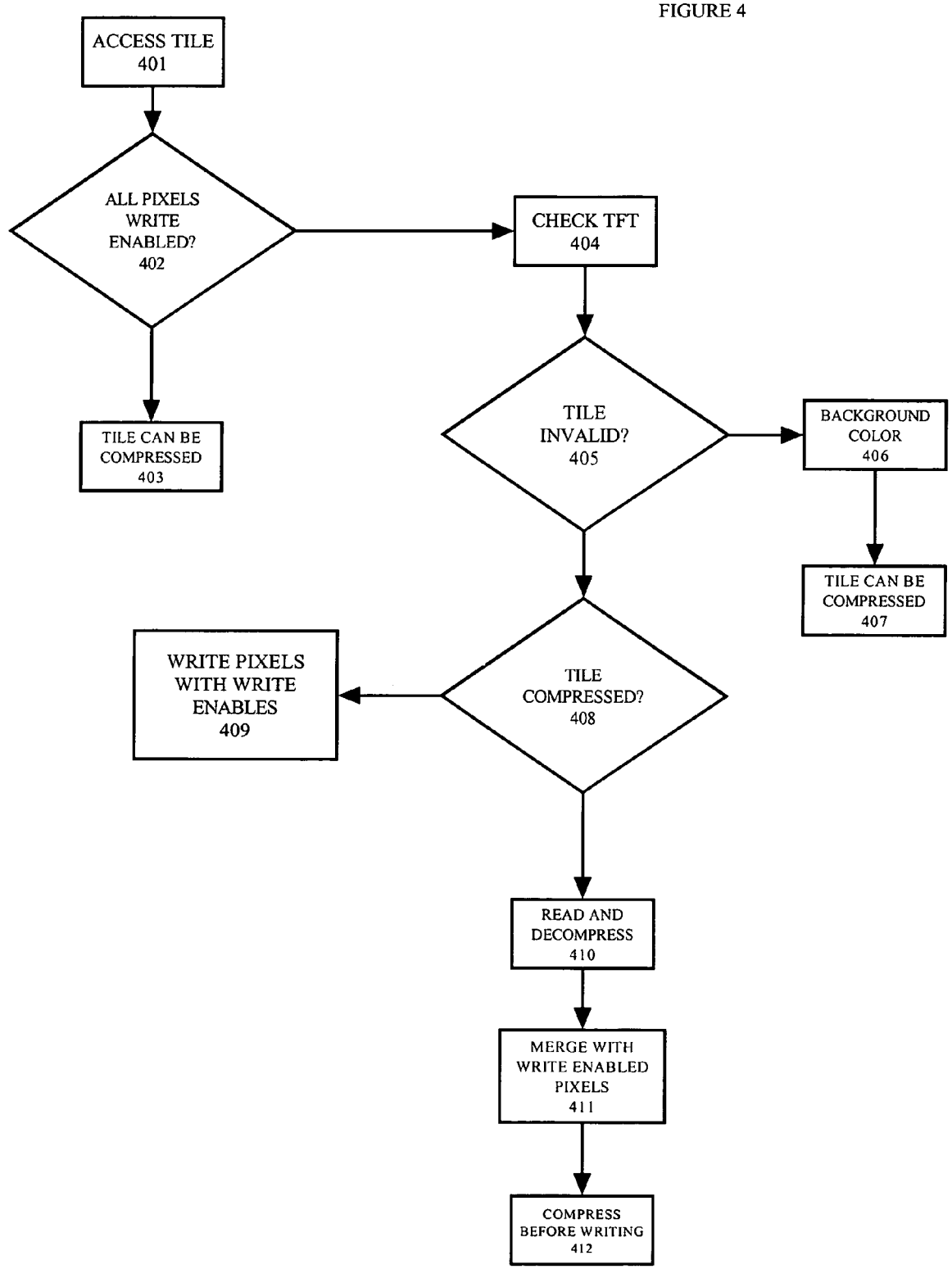
FIG. 4 is a flow diagram of write only operations with color compression.

A graphics processor performing write only operations with color compression operates as shown in the flow diagram of FIG. 4. A tile is accessed (step 401). If all pixels in the tile are write enabled (step 402), the tile can be compressed before writing to memory (step 403). If only some pixels in the tile are write enabled, the action depends on the tile status in the TFT (step 404). If the TFT identifies the tile as invalid (step 405), then the background color is substituted for write disabled pixels (step 406) and the tile can be compressed before writing to memory (step 407). If the TFT identifies the tile as uncompressed, then pixels can be written to the memory tile with write enables (step 409). If the TFT identifies the tile as compressed, then the memory tile is read and decompressed (step 410), merged with the write enabled pixels (step 411), and compressed before writing the tile to memory (step 412). A tile which the TFT identifies as uncompressed to which only some pixels in the tile are to be written may also be read from memory, uncompressed, merged with the write enabled pixels, and compressed before writing the tile to memory.

Continuous Tone

Color compression methods take advantage of the continuous tone nature of graphics images. This means that over a small region of the image, such as a tile, the total number of colors is less than the total possible colors. For example, 64 pixels in an 8×8 tile have 64 possible colors in comparison with 64K colors for 16 bit pixels or 16M colors for 24 bit pixels. Furthermore, over a tile the pixels have the colors of one or a few graphics objects of the same rendering properties (material colors, textures, and lighting computations) and so the range of the colors is less than the numerical size of the color space. (In particular, objects often have a major hue. For example, a greenish object may have wide variations in green color components and small variations in red and blue color components). State of the art high quality graphics is characterized by smooth color variations between pixels in objects, such as by shading and texture filtering, which reduces the total range of colors in a tile and the differences between pixels in a tile. (On the other hand, regions of a color image may contain wide color variation (for example, autumn leaves in a forest scene), which, since compression must be lossless, is accomodated by uncompressed pixel tiles whose memory bandwidth is no worse than that of an ordinary color image).

Dithering

When the size of color pixels is reduced for memory size and bandwidth efficiency, such as 16b pixels instead of 24b pixels, the graphics processor typically computes color values at 24 bit precision, and dithers (adds 2D noise) before trunctation to 16b, which reduces the banding artifacts of truncation in continuous tone images. Dithering produces additional small pixel differences between adjacent pixels in tiles, for example, 24b bit color varying by 1 bit per pixel across a tile when dithered and truncated to 16b color will result in many adjacent 16b pixels which differ by +1 bit. This low magnitude dithered pixel difference can also be exploited by compression.

Compression Algorithms

The present invention contemplates any of a number of compression schemes for practicing the invention. The invention also contemplates choosing from among a number of possible compression schemes for each tile. The compression scheme or schemes should be such that their implementation can be done quickly enough to not negate storage and bandwidth advantages that result from compression.

Difference Coding

Difference coding is used in one embodiment of the invention. This scheme computes color differences between each color component (red, green, blue) for pixels in a tile. As noted above, the continuous tone nature of graphics renders the differences to be small numbers, so the difference values are entropy coded (variable bit length coded). For example, with 8 bit color components, a difference of zero could be encoded in 1 bit, a difference of +1 in 3 bits, a difference of +2 in 4 bits, and so forth. With a majority of small differences, the number of encoded bits per color component per pixel will likely be less than the number of uncompressed bits. Entropy coding is well established in the industry. A preferred implementation is exponent encoding, where the code is the magnitude of the difference, followed by a difference offset of that magnitude. For example 0 0
10s +−1
110s +−2
1110sx +−3−4
11110sxx +−5−8
etc where s indicates the sign and x indicates the offset from the difference magnitude code. Offsets are converted to sign and magnitude form so that the offset data bits contain only the possible offsets without the extra values for two's complement notation, which is to say, without an offset value for zero, which is not a useful offset value.

The range of difference encodings can be truncated to the full pixel component value at less than the maximum difference. For example, with 8 bit components and exponent encoding, a maximum difference of +128 to 255 might encode in 9 bit code plus 8b signed offset, or 17 bits per component (larger than the 8 bit component). Since large differences are rare in tiles which can be compressed, a smaller code can be used to describe the actual absolute 8 bit component instead of a relative difference offset. For example 0 0
10s +−1
110s +−2
1110sx +−3−4
11110xxxxxxxx 8 bit component value The first pixel in a tile is always an absolute color value or index value, so no code field is needed, that is, difference encoding begins at the second pixel in a tile. The tile header field can contain the value of the first pixel in the tile.

The preferred implementation uses difference codes 0,1,2,3 and absolute 5 or 6 bit component for 16b pixels, and difference codes 0,1,2,4,8,16,32 and absolute 8 bit component for 24 bit pixels. Many other difference coding schemes are possible and may be desirable for different application image characteristics.

Direct and Indexed Differences

Direct difference compression is performed by encoding color component differences between adjacent pixels. Index color differences extracts the unique color values per tile, while index component differences extract the unique component values per tile. The unique color values are sorted by least sum of absolute differences between the components of the colors, and then entropy difference encoded. The unique component values are sorted in numerical order, which minimizes difference between components, and then entropy difference encoded. In either indexed method, each pixel in the group is described by an index to the unique color it contained, or indices to the unique components it contained. The pixel indices are then entropy difference encoded between pixels.

Indexed color and component compression can provide superior compression for images with fewer but more widely separated colors per group, such as 2D graphics, and for fewer bits per color component, such as 16b pixels, since the possible color values are limited by truncating the number of bits per component from the full range of more bits per component images, such as 24b color. Indexed component compression can also be superior in tiles which larger variation in some color components and smaller variation in other components, such as a predominant hue.

Index Sorting

Unique color or component values can also be sorted by pixel index differences, in that if colors indexed frequently by adjacent pixels are adjacently in order, then the pixel index differences will be small and generate short entropy codes, at the expense of potentially larger differences between the unique color or component values.

Traversal Order

Direct or index difference pixel traversal order can vary to produce better compression. Common traversal methods within a 2D tile include row order, column order, left or right diagonal order, ascending, descending or zigzag, winding spiral inward, winding spiral outward. For example, if the tile contains a horizontal color discontinuity (like a horizon line), row major encoding will be superior to column major, since fewer large adjacent pixel differences will be encountered. Similar reduction in pixel differences by traversal order for the orientation and shape of tile color discontinuites are found, such as column order for vertical discontinuities, diagonal for diagonal discontinuities, and spiral for inclusive shapes. Significant difference reduction can be achieved by vairable selection order for individual pixels or groups of pixels within tiles, however the additional storage needed to describe subtle transversal order can reduce the storage savings of smaller differences.

Code Sorting

The popularity of difference values will differ between tiles in an image and between images. For example, smoothly shaded images have many small differences, and high contrast areas have many zero and large differences with few small differences. Pixel indices may alternate between a small number of unique colors or components in a tile, such as text overlays, so that certain index differences are more common than others. Entropy codes can be assigned by the popularity (pixel count with the tile) of the differences they encode to provide superior compression, that is, shorter codes are assigned to the more common differences in a tile, and longer codes to less common differences.

Multiaxis Codes

Image tiles often contain areas of solid color, in which multiple component or index differences are zero, or large changes between color components or indices, such as 2D graphics. The popularity of multiple component differences, such as all zeros or all large magnitude differences, can be determined, and conditionally assigned single multidifference codes versus one code per component if the storage savings of single codes for multiple differences is greater than the use of codes for single differences.

Conditional Tile Encoding

As noted above, each tile can be compressed by one of a plurality of compression algorithms. The compression algorithm for each tile can be identified with the TFT memory data of the compressed tile, for example in a header field with bit subfields to indentify traversal order, entropy code assignment, maximum difference code, 3 axis codes, direct versus indexed differences, number of unique colors or components. The tradeoff is between the cost of the encoder/decoder and the memory bandwidth savings. The compression method for the tile described in the header can be conditionally encoded, so that the description of complex or unusual coding methods takes more header storage than common methods, compensated by the storage savings of the more complex methods. For example, a single header bit might described typically default compression, followed by more bits of header only for the non default methods.

Preferred Implementation

The preferred implementation performs direct difference encoding with condtional row/column traversal and popularity code sorting (since this provides 90% of the compression achieved with other methods for typical contemporary 3D images at comparatively low implementational cost and complexity). Other features of the compression algorithms may provide superior compression for other or future image types and justify implementations of different cost and complexity.

Parallel Pixel Compression and Decompression

Contempory graphics processor memory interfaces are wider than a single pixel, for example 64, 128, or 256 bits of memory data per clock, or around 4 to 16 pixels per clock. For compression and decompression to not degrade system throughput, they need parallel pixel throughput at that rate. This is problematic for entropy coding, where the location of the Nth code depends on the size of the preceeding N−1 codes. Parallel decoding is further compounded by concatenating data fields with code fields, because an entropy code is typically identifed by a 0 terminated string of 1's (or a 1 terminated string of 0's), and concatenated data fields contain unpredictable zeros and ones. Futhermore, the maximum code length times the number of parallel pixel component values determines the bit stream window which must be decoded at once, for example, 8 pixels times 3 components times 16 bit codes would require a 384 bit wide combinatorial decoder, which is quite large. Note that the data field can range from no bits for a zero difference, one sign bit for a difference of one, up to the number of bits in the color component, such as 5 or 8.

Parallel decoding can be facilitated by separating the pixel code fields and data fields into seperate streams within each pixel group, with the group header identifying the starting stream location(s) with the memory words. In this way, the code parsing can be limited to a sum of the bit counts to all the terminal 0's (or 1's), and the maximum bit stream window can be limited to the maximum code bit field size times the number of parallel pixel components (for example 8 pixels times 3 components times 5 bit codes requires a 120 bit decoding window). Once the locations of the next N codes are extracted, their data field lengths defined by the codes can be summed to provide the location of data fields for the parallel pixel components in the data field stream.

Similary on the encoding side, the sum of the code lengths for the N parallel pixel components provides the location in the code stream to insert each code, and the sum of the data field lengths of those codes provides the location in the data stream to insert each data field.

As long as the codec throughput matches the memory interface pixel throughput, it can be farily deeply pipelined up to the latency tolerance of the graphics processor, for example in order to align compressed tile header, code array, data array, and in the case of index encoding unique color and component arrays.

An alternative implementation is to decompress and compress several tiles in parallel, each with less pixel parallelism than the memory interface, which simplifies the variable length code and data field parsing to fewer fields per group. However, this approach has the disadvantages of more storage for several tiles, lower efficiency when few tiles are accessed simultaneously, and longer latency for each tile.

Hierarchical Compressed Storage

Image compression can be implemented in a memory hierarchy, in which for example one or few memory words per tile are stored in smaller local higher speed memory, and the remaining memory words per tile are stored in more distant slower speed memory. A common implementation would be a smaller on chip memory such as SRAM or embedded DRAM for the first word per tile, and off chip DRAM memory for the remaining words. Since many tiles of typical images compress into few words, this memory hierarchy provides faster access for most of the tiles without the cost of the entire image in local memory. On a tile read, the TFT status controls whether and how many more distant memory words are needed, and on tile write the compression controls whether more and how many distant memory words are written, while the local memory is read and written for all valid tiles. The local compressed memory could be implemented as a cache of the more distant memory.

A further refinement of a memory hierachy supports variable image size compression in addition to compressed image bandwidth improvement. The entire image can be allocated at the minimum compressed tile size, for example one memory word. Addiitional memory words be tile can then be allocated conditionally for tiles that compress into more memory words or are stored as uncompressed pixels. Memory access to a tile is performed in a burst of 1 to N memory words, however the addresses of the words are not consecutive, but depend on the allocation of the words for the tile. The TFT can be extended to store not only the number of words per tile, but the memory locations of additional memory words. Memory allocation and garbage collection algorthims can be applied when each tile is compressed by removing or returning words from or to a free list and updating the TFT, or can be applied at the end of an image update and display when the entire allocated memory is freed, or at times in between, depending on the tradeoff between memory management overhead and memory size. Such memory allocation techniques are well known.

Lossy Compression

If tradeoffs between image quality and memory bandwidth are acceptable, the compression methods can be extended to lossy compression for reduced tile size. For example, truncating or rounding pixel differences to a range such as log 2 reduces difference code and offset sizes. Adjacent pixels are differenced from the truncated difference to distribute error. For indexed differences, unique color and component differences for example could be similarly truncated or rounded to reduce the number of unique values, their difference code sizes, and the range of pixel indices and consequently their difference code sizes.

Variable Lossy Compression

If memory allocation for compressed images is supported, it is often desirable to limit the maximum memory allocation for images. If lossy compression is supported, it is feasible to vary the compression, for example by decreasing the resolution of pixel differences and consequently decreasing the difference code sizes, when the image size approaches the maximum memory allocation, and similarly increase the difference resolution when the image size declines, such as at the beginning of an image update or when regions of low complexity overwrite regions of high complexity. In this way a dynamic tradeoff between image quality and memory size and bandwidth could be maintained. As with other variable compression algorithms described above, the difference resolution could vary per image tile as defined in the tile header.

I claim:

1. A method of compressing color pixels in a graphics processor system comprising;

defining a plurality of tiles of data;

defining a tile format table containing a status entry for each of said plurality compressing each of said tiles, wherein each tile is compressed if it is determined that compression results in a smaller tile size;

setting said status entry for each of said tiles in said tile format table, wherein said status entry indicates the the length in words of each of said tiles after compression, with a full size indicating a non-compressed tile;

storing said tiles in a memory; and retrieving said tiles from said memory whereby said status entry is used to determine whether said tiles need to be decompressed at time of retrieval;

wherein each of said tiles is compressed using one of a plurality of compression methods;

wherein each of said tiles is comprised of pixels having pixel color components; and wherein one of said compression methods comprises entropy encoded differences between adjacent pixel color components, in which unique color or component values in a tile are extracted and sorted by minimal difference, are entropy encoded, and are indexed per pixel in said tile.

2. The method of claim 1 in which the assignment of entropy codes per tile is based on the frequency of occurrence of difference values within said tile.

3. The method of claim 2 in which multiple component difference codes are combined into a single code per pixel.

4. The method of claim 1 in which said unique colors and components are sorted in a manner that minimizes a size of pixel difference encoding and minimizes a size of color and component difference encoding.

* * * * *

UNITED STATES PATENT AND TRADEMARK OFFICE
CERTIFICATE OF CORRECTION

PATENT NO. : 7,039,241 B1 Page 1 of 1
APPLICATION NO. : 09/637456
DATED : May 2, 2006
INVENTOR(S) : Timothy J. Van Hook It is certified that error appears in the above-identified patent and that said Letters Patent is hereby corrected as shown below:

Col. 10, line 31, after "plurality" insert --of tiles;--

Col. 10, line 31, begin new sub-paragraph with "compressing"

Col. 10, line 35, delete second "the"

Signed and Sealed this

First Day of August, 2006

JON W. DUDAS
*Director of the United States Patent and Trademark Office*